(12) United States Patent
Kato

(10) Patent No.: US 7,442,952 B2
(45) Date of Patent: Oct. 28, 2008

(54) METHOD FOR ERASING RADIATION ENERGY REMAINING IN RADIATION IMAGE STORAGE PANEL

(75) Inventor: Munetaka Kato, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

(21) Appl. No.: 11/475,953

(22) Filed: Jun. 28, 2006

(65) Prior Publication Data
US 2006/0289814 A1 Dec. 28, 2006

(30) Foreign Application Priority Data
Jun. 28, 2005 (JP) .............................. 2005-189015

(51) Int. Cl.
*G01N 23/04* (2006.01)
(52) U.S. Cl. ..................................... 250/588
(58) Field of Classification Search ................. 250/588, 250/581, 483.3, 483.4, 909
See application file for complete search history.

(56) References Cited

U.S. PATENT DOCUMENTS 5,818,065 A  10/1998  Exelmans
7,250,622 B2 *  7/2007  Nakajo et al. ............... 250/588
2005/0189505 A1 *  9/2005  Nakajo et al. ............... 250/588

FOREIGN PATENT DOCUMENTS

| JP | 06-175243 | | 6/1994 |
|---|---|---|---|
| JP | 11-311848 | * | 9/1999 |
| JP | 2001-033902 | | 2/2001 |
| JP | 2001-074898 | | 3/2001 |
| JP | 3582041 | | 8/2004 |

\* cited by examiner

*Primary Examiner*—David P. Porta
*Assistant Examiner*—Kiho Kim
(74) *Attorney, Agent, or Firm*—Sughrue Mion, PLLC

(57) ABSTRACT

The step of erasing radiation energy remaining in a radiation image storage panel having an energy-storing phosphor layer composed of a phosphor in the form of columnar crystals and having been subjected to the step for reading a radiation image recorded in the storage panel according to a radiation image recording and reproducing method can be performed using an erasing light in an amount which is determined from an amount of the radiation having been applied to the storage panel.

4 Claims, 3 Drawing Sheets

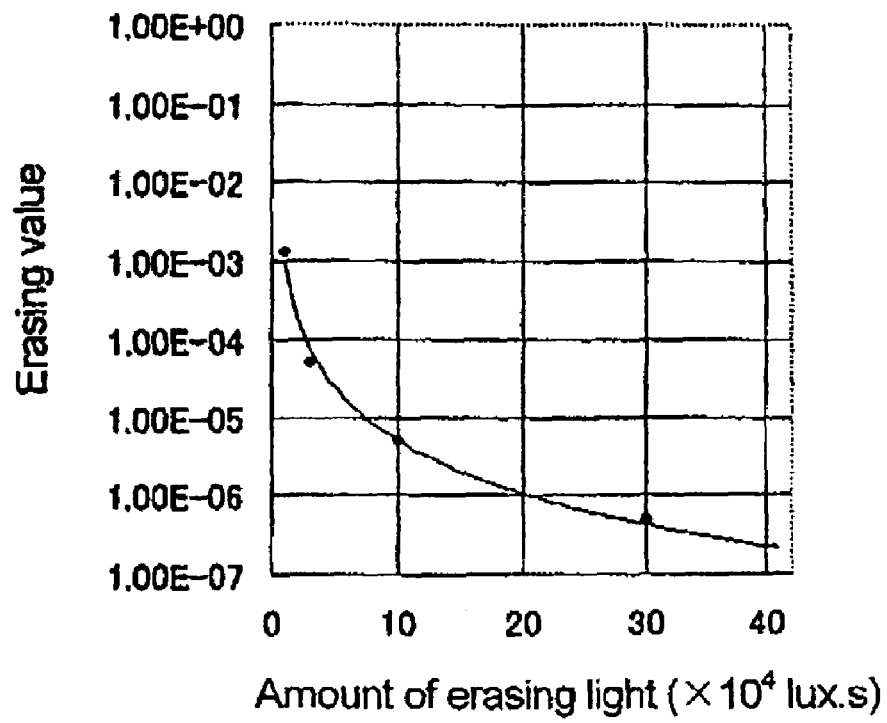
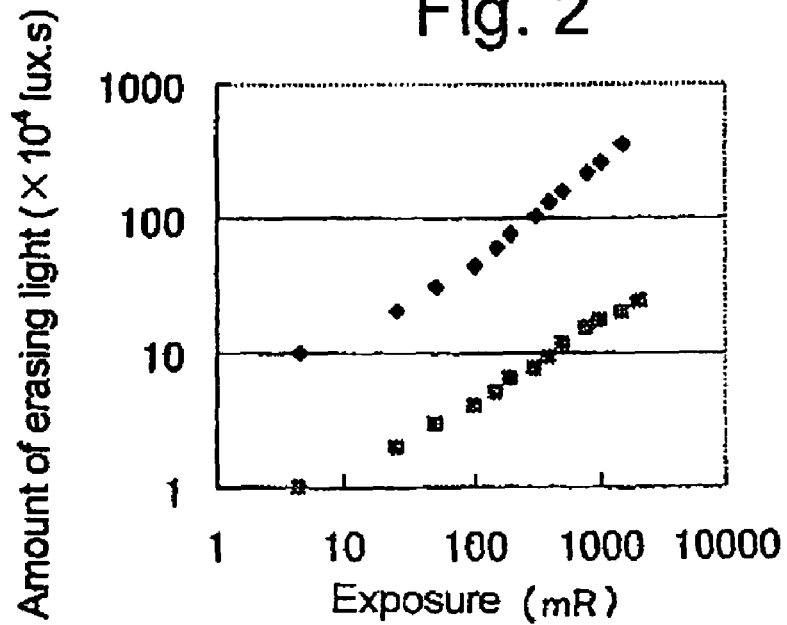

(1) Inputting mass values of X-ray source and distance (2) Calculating X-ray exposure (3) Determining amount of erasing light from erasing table (4) Controlling amount of erasing light

METHOD FOR ERASING RADIATION ENERGY REMAINING IN RADIATION IMAGE STORAGE PANEL

FIELD OF THE INVENTION

The present invention relates to a radiation image recording and reproducing method and particularly relates to a method for erasing radiation energy remaining in a radiation image storage panel having an energy-storing phosphor layer comprising a phosphor in the form of columnar crystals and having been subjected to the step for reading a radiation image recorded in the storage panel according to a radiation image recording and reproducing method.

BACKGROUND OF THE INVENTION

When exposed to radiation such as X-rays, an energy-storing phosphor (e.g., stimulable phosphor, which gives off stimulated emission) absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the storage panel; sequentially scanning the storage panel with stimulating light such as a laser beam to emit stimulated light; and photoelectrically detecting the emitted light to obtain electric image signals. The radiation image storage panel thus treated is generally subjected to a step for erasing radiation energy remaining therein. In the erasing step, the panel is irradiated with light (i.e., erasing light) for erasing (or releasing) the remaining radiation energy. After the erasing step is complete, the storage panel is stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon. If the phosphor layer is self-supporting, however, the support may be omitted. Further, a protective layer is generally provided on the free surface (surface not facing the support) of the phosphor layer so as to keep the phosphor layer from chemical deterioration or physical damage.

Various kinds of energy-storing phosphor layers are known. For example, the phosphor layer can comprise a binder and energy-storing phosphor particles dispersed therein, or otherwise can comprise agglomerate of an energy-storing phosphor without binder. The latter layer can be formed, for example, by a gas phase-accumulation method, in which a phosphor is vaporized or sputtered under vacuum so that the phosphor would be deposited and accumulated on a substrate to form a layer of the phosphor in the form of columnar crystals. The phosphor layer thus formed by a gas phase-accumulation method contains no binder and consists of only the phosphor, and there are gaps among the columnar crystals of the phosphor. Because of these gaps, the stimulating light can stimulate the phosphor efficiently and further the emitted light can be collected efficiently. Accordingly, a radiation image storage panel having an energy-storing phosphor layer comprising a phosphor in the form of columnar crystals has high sensitivity. At the same time, since the gaps prevent the stimulating light from diffusing parallel to the phosphor layer, the storage panel can give a reproduced image of high sharpness.

In the radiation energy erasing step of the radiation image recording and reproducing method (or radiation image forming method), the amount or energy of erasing light in the erasing step is generally determined according to reading sensitivity (dynamic range) or intensities of signals obtained in the reading procedure.

JP-A-6-175243 discloses a radiation image-reading apparatus equipped with a means for erasing a radiographic latent image and a means for controlling the erasing. The erasing means comprises an erasing light source for emitting erasing light, and the controlling means controls the amount and/or scanning speed of the erasing light according to the dynamic range of reading. Since the dynamic range is generally determined to a level larger than the maximum signal to be read out, the amount of erasing light determined on the dynamic range often has excessively large energy. Consequently, it is difficult to reduce energy consumption of the erasing light source in the apparatus.

U.S. Pat. No. 5,818,065 discloses a radiation image reading method and an apparatus thereof in which an energy-storing phosphor sheet after subjected to the erasing step is again subjected to the reading procedure. If the signals obtained in the second reading procedure is stronger than a predetermined value, the sheet is again subjected to the erasing step. In the disclosed method and apparatus, it is necessary to perform the reading procedure twice, and further if the remaining energy is insufficiently erased, it is necessary to perform again the erasing step. Accordingly, a reading system adopting the disclosed method has poor throughput, and parts of the disclosed apparatus such as a laser source for stimulation, a signal detector (e.g., CCD) and an erasing light source show short life times.

JP-A-2001-33902 discloses a method for determining an amount of energy required to erase the remaining radiation energy. In the disclosed method, the required energy level is estimated from the maximum light amount (maximum signal intensity) of stimulated emission. If the emission is stronger than the largest intensity level measurable in the reading system, the maximum light amount is assumed on the basis of, for example, a histogram beforehand prepared according to the desired radiation image, and the energy level of erasing light is determined from thus obtained maximum light amount. This method needs a means for determining the energy level of erasing light on the basis of the obtained signals.

JP-A-2001-74898 discloses a radiation image reading method and an apparatus thereof in which a stimulable phosphor screen comprising a divalent europium activated cesium halide (chloride or bromide) phosphor and having a surface area not larger than $S_{max}$ is exposed to erasing light emitted from an erasing light source having an electric power not larger than $S_{max} \times 1$ J, so as to erase radiation energy remaining in the screen. In this method, the irradiation power of erasing light is determined independently of the exposure of radiation but from the surface area of the screen, and hence too much erasing energy would be required. Further, the degree of erasing depends on not only the irradiation power but also the amount (i.e., illuminance and irradiation time) of erasing light received by the screen.

Japanese Patent No. 3,582,041 discloses a radiation image-reading apparatus equipped with an erasing light-controlling means. In the apparatus, if a radiation image storage panel is to be subjected to the reading procedure of higher sensitivity than the prior reading procedure, the erasing light-controlling means makes the storage panel irradiated with erasing light before radiation image information is recorded therein. Further, after the recorded radiation image information is read out with the higher sensitivity in the reading procedure, the storage panel is irradiated again with the erasing light in an amount determined according to that reading sensitivity.

The reading apparatus, by which radiation image information is read out from a radiation image storage panel, is generally equipped with an erasing means for the erasing step. However, it is desired to shorten the time for erasing and thereby to increase throughput of the apparatus. Further, it is also desired to simplify the apparatus and thereby to reduce the cost.

SUMMARY OF THE INVENTION

It is an object of the present invention to provide a simple and advantageous method for determining the amount of an erasing light required for efficiently erasing radiation energy remaining in a radiation image storage panel.

The applicant has studied the amount of erasing light required in the erasing step, and found that there is a relation between the exposure of radiation having been applied to the storage panel and the required amount of erasing light. Further, it is further found that the exposure of radiation can be experimentally determined according to irradiation conditions of the radiation source. It is known that if the storage panel comprises a phosphor layer is composed of column phosphor crystals, the erasing light efficiently reaches deeply into the phosphor layer. Accordingly, the amount of erasing light required for erasing the radiation energy remaining in the columnar phosphor layer is much smaller than that required for erasing the energy remaining in the conventional phosphor layer formed by a coating process. It has been now discovered that the required amount of erasing light can be easily and properly determined according to the level of the exposure of radiation used for recording radiation image information. In other words, it has been discovered that there is a good relationship between the amount of the radiation applied to the storage panel and the amount of the erasing light required for erasing the radiation energy remaining in the storage panel to a predetermined level is described.

The present invention resides in a radiation image recording and reproducing method comprising the steps of applying a radiation onto a radiation image storage panel through an object, whereby recording a radiation image of the object in the storage panel; sequentially scanning the storage panel with a stimulating light to emit a stimulated light from the storage panel and photoelectrically detecting the emitted light to obtain electric signals of the radiation image; reproducing the radiation image from the electric signals; and erasing radiation energy remaining in the radiation panel, wherein the radiation image storage panel has an energy-storing phosphor layer comprising a phosphor in the form of columnar crystals and the step of erasing radiation energy is performed using an erasing light in an amount determined from an amount of the radiation having been applied to the storage panel.

According to the method of the invention, the amount of erasing light can be easily and properly determined on the basis of irradiation conditions (such as energy intensity of radiation, irradiation time, distance between the panel and the radiation source) in the radiation image recording procedure. Accordingly, the erasing light can be so properly controlled that the energy consumption can be reduced.

Accordingly, the amount of erasing light can be rapidly determined and hence the time of the erasing step can be shortened. As a result, the successive procedures for the step of radiation image-reading to the step of remaining energy-erasing can be rapidly carried out to improve throughput of the whole radiation image recording and reproducing system. In addition, it is unnecessary to provide a means or mechanism for determining and controlling the amount of erasing light between the reading means and the erasing means, and hence the reading apparatus can be simplified.

The preferred embodiments of the invention are as follows:

(1) The amount of the erasing light is determined using an erasing table in which a predetermined relationship between the amount of the radiation applied to the storage panel and the amount of the erasing light required for erasing the radiation energy remaining in the storage panel to a predetermined level is described.

(2) The relationship is described in such manner that the amount of the erasing light is described in the form of a predetermined value for the radiation energy applied to the storage panel in a predetermined range.

(3) The predetermined value of the amount of the erasing light is 400,000 lux·s for the radiation energy applied to the storage panel in the range of not larger than 2R but not less than 500 mR.

(4) The predetermined value of the amount of the erasing light is 200,000 lux·s for the radiation energy applied to the storage panel in the range of less than 500 mR but not less than 50 mR.

(5) The predetermined value of the amount of the erasing light is 100,000 lux·s for the radiation energy applied to the storage panel in the range of less than 50 mR.

BRIEF DESCRIPTION OF DRAWINGS

FIG. 1 is a graph showing an example of relation between the erasing value and the amount of erasing light to reach the erasing value.

FIG. 2 is a graph (namely, erasing table) showing a relationship between the exposure of X-rays and the required minimum amount of the erasing light.

DETAILED DESCRIPTION OF THE INVENTION

Figure 3:
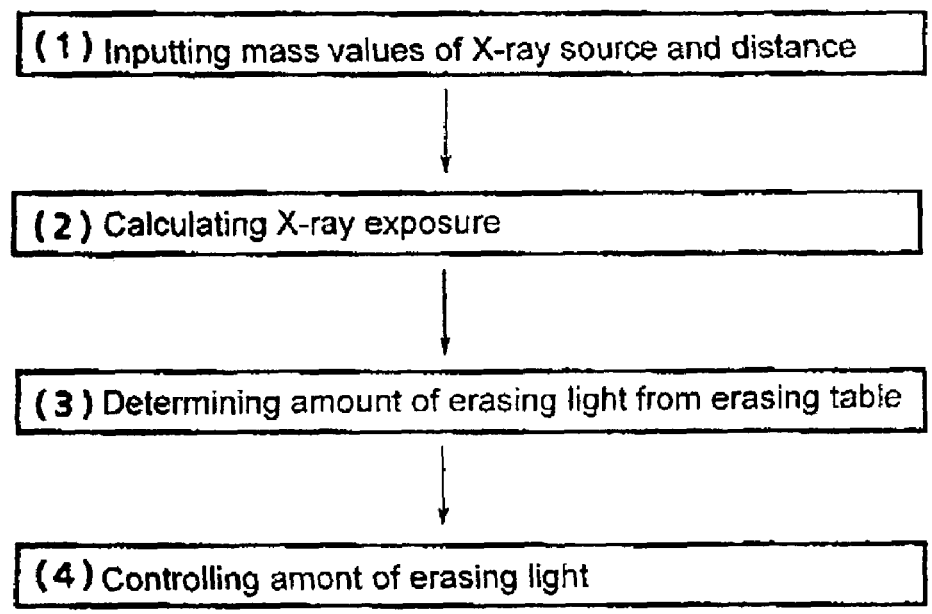
FIG. 3 is a block chart illustrating a sequence of erasing procedures in the method of the invention.

In the method of the invention, the radiation source preferably is an X-ray source and the amount of erasing light is determined according to exposure of X-rays having been applied to the radiation image storage panel. The exposure of X-rays can be calculated on the basis of mass values (which are tube voltage, tube current and irradiation time) of the X-ray source and a distance between the storage panel and the source.

The amount of erasing light is preferably controlled to be not more than 400,000 lux·s when the exposure of X-rays is not more than 2 R. Further, the amount of erasing light is preferably controlled to be not more than 100,000 lux·s when the exposure of X-rays is not more than 50 mR.

The method of the invention is explained below in detail referring to the attached drawings, by way of example, in the case where the radiation source is an X-ray source.

In the invention, the amount (illuminance×time) of erasing light applied to a storage panel in the erasing step can be determined on the basis of irradiation conditions (such as energy intensity of radiation, irradiation time, distance between the storage panel and the radiation source). For example, if the radiation source is an X-ray source, the amount of erasing light can be determined using mass values (i.e., tube voltage, tube current and irradiation time) of the X-ray source and a distance between the storage panel and the source (X-ray tube).

The exposure of X-rays applied to the storage panel is in direct proportion to the tube voltage C and the irradiation time t included in the mass values, and is in inverse proportion to the square of distance d between the storage panel and the source. The exposure of x-rays, therefore, is estimated by the formula: exposure=$k \times C \times t/d^2$ in which k is an experimentally determined constant. In the chest X-ray radiography, for example, the distance d is determined by the focal length of chest grid. The amount of X-rays practically absorbed and stored in the storage panel is largest in the area where the X-rays are directly applied to the storage panel without passing the object, and is known to be almost in proportion to the exposure.

A level of radiation energy remaining in a storage panel can be indicated by an erasing value, which is obtainable in the following manner. First, a radiation image storage panel is exposed to X-rays of a mR, to store X-ray energy. The storage panel is then exposed to a stimulating light, and stimulated emission given off from the storage panel is detected to measure the initial stimulated emission intensity A. Thereafter, the storage panel is exposed to X-rays of b mR, to store X-ray energy, and then irradiated with an erasing light to erase the X-ray energy remaining in the storage panel. The storage panel having been subjected to the erasing procedure is exposed to the stimulating light in the same manner as described above, and stimulated emission given off from the storage panel is detected to measure a stimulated emission intensity B. The erasing value is basically represented by the ratio of B/A, but in consideration of X-ray exposure difference (b/a) it can be expressed by the following formula:

Erasing value=$B/\{A \times (b/a)\}$.

FIG. 1 is a graph showing a relationship between the erasing value and the amount of an erasing light (×10,000 lux·s). The relationship shown in FIG. 1 was obtained in Example 1 (described later), in which a radiation image storage panel comprising a phosphor layer consisting of stimulable CsBr: 0.001 Eu phosphor in the form of columnar crystals was examined.

It is known that if a radiation image storage panel which has been subjected to the erasing procedure and then exposed to X-rays of 0.012 mR gives only an undetectable stimulated emission, the storage panel having been subjected to the erasing procedure is practically employable without troubles in the next recording and reproducing procedure. For example, if the initial radiation exposure is 50 mR, the required erasing value is 0.012/50=$2.4 \times 10^{-4}$. The graph shown in FIG. 1 indicates that the erasing value of $2.4 \times 10^{-4}$ corresponds to the erasing light amount of approx. 25,000 lux·s.

In that way, a relation between the exposure of X-rays (mR) and the amount of erasing light (×10,000 lux·s) can be obtained. This relationship can be referred to as "erasing table", and FIG. 2 shows two erasing. The erasing table indicated by ■-■ in FIG. 2 was obtained in Example 1 (described later), in which a radiation image storage panel comprising a phosphor layer consisting of CsBr:0.001 Eu stimulable phosphor in the form of columnar crystals is examined. The other erasing table indicated by ♦-♦ in FIG. 2 was obtained in the case where a storage panel comprising a conventional phosphor layer formed by a coating process was examined.

According to the graph shown in FIG. 2, it is understood that the required amount of erasing light can be estimated from the exposure of X-rays.

Figure 5:
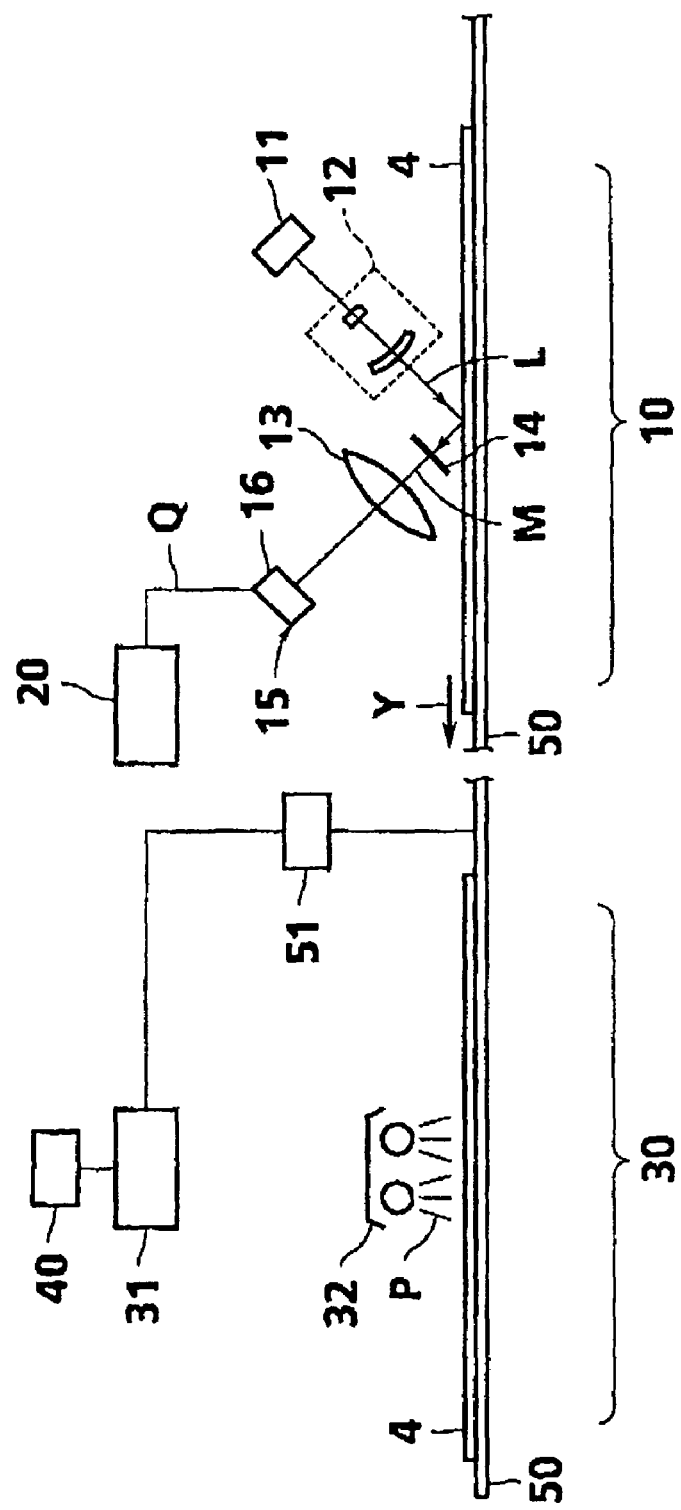
FIG. 5 is a sectional view schematically illustrating an example of radiation image-reading apparatus in which the radiation image-reading step and the erasing step of the method of the invention is performed.

FIG. 3 is a block chart illustrating a sequence of erasing procedures in the method of the invention, and FIG. 5 is a sectional view schematically illustrating an example of radiation image-reading apparatus in which the method of the invention can be performed.

The method of the invention can be practically carried out according to the block chart of FIG. 3. The sequence of erasing procedures illustrated in FIG. 3 is as follows.

(1) First, the mass values of X-ray source and the distance between the storage panel and the source are input, for example, from an input-terminal 40 into an erase-controlling device 31 shown in FIG. 5.

(2) Second, in the erase-controlling device 31, the exposure of X-rays having been applied to the storage panel is calculated according to the input data in the manner described above.

(3) Third, the required amount of an erasing light is determined from the calculated exposure on the basis of the erasing table (FIG. 2), which is beforehand installed in the erase-controlling device 31.

(4) Finally, the erase-controlling device 31 sends control signals to a belt-driving controller 51, to adjust the speed of a conveyer belt 50 so that the storage panel 4 can be irradiated with the erasing light P in the determined amount.

In order to facilitate the above procedures (3) and (4), the erasing table can be so simplified that the amount of erasing light is graded into some levels according to the exposure of X-rays. For example, the erasing table shown in FIG. 2 can be simplified into the following three levels.

When the exposure R is less than 50 mR (namely, in the range of R<50 mR), the amount of erasing light is 50,000 lux·s.

When the exposure R is in the range of 50 mR≦R<500 mR, the amount of erasing light is 150,000 lux·s.

When the exposure R is 500 mR or more (namely, in the range of 500 mR≦R), the amount of erasing light is 300,000 lux·s.

In the range of 500 mR≦R, the exposure is thought to be at most 2 R and hence the amount of erasing light can be determined to be 300,000 lux·s.

If those levels are beforehand installed instead of the erasing table in the erase-controlling device, the amount of erasing light can be more easily determined and controlled. The less levels the amount of erasing light is graded into, the more the reading apparatus can be simplified.

In consideration of individual differences of storage panels, the above levels may allow margins, for example, as described below.

When the exposure R is less than 50 mR (namely, in the range of R<50 mR), the amount of erasing light is 100,000 lux·s.

When the exposure R is in the range of 50 mR≦R<500 mR, the amount of erasing light is 200,000 lux·s.

When the exposure R is in the range of 500 mR≦R≦2 R, the amount of erasing light is 400,000 lux·s.

The amount of erasing light required for the storage panel comprising a gas-accumulated phosphor layer (indicated by ■-■ in FIG. 2) is less than one tenth of that required for the storage panel comprising a conventional phosphor layer formed by the conventional coating process (indicated by ♦-♦ in FIG. 2). Further, the former (■-■) ranges (from 10,000 lux·s to 240,000 lux·s) more narrowly than the latter (♦-♦) ranges (from 100,000 lux·s to 3,500,000 lux·s). Therefore, even if a slightly excess amount of the erasing light is applied so as to erase the remaining energy sufficiently, the energy consumption and the period of time for erasing are not extremely increased. Further, since the required amount of the erasing light is within the narrow range, the erasing table can be properly simplified into two or three levels and thereby the erasing step can be further facilitated while the energy consumption can be also reduced.

In the above procedure (4), it is possible to control not the moving speed of conveyer belt but the scanning speed of the erasing light. If the method of the invention is adopted in an X-ray image recording and reproducing apparatus of built-in type (which comprises an X-ray image-recording unit equipped with a radiation image storage panel), the procedure (1) can be automatically carried out. For example, in that apparatus, the X-ray source directly sends signals of irradiation conditions to the erase-controlling device.

According to the method of the invention, the amount of the erasing light can be easily and properly determined. At the same time, the erasing light can be so properly controlled that the energy consumption can be reduced.

In the above description, the method of the invention is explained, by way of example, in the case where the radiation source is an X-ray source. However, the radiation source may be a device generating neutron beams or other ionization radiations such as -rays, -rays, -rays, electron beams and ultraviolet rays.

The radiation image storage panel used in the invention comprises a phosphor layer consisting of energy-storing phosphor in the form of columnar crystals formed by a gas phase-accumulation method. Examples of the gas phase-accumulation method include a vapor-deposition process of resistance-heating type or electron beam type, a sputtering process or a chemical vapor deposition (CVD) process.

The energy-storing phosphor is preferably a stimulable phosphor giving off stimulated emission in the wavelength region of 300 to 500 nm when exposed to a stimulating ray in the wavelength region of 400 to 900 nm. The phosphor is preferably an alkali metal halide stimulable phosphor represented by the following formula (I):

$$M^{I}X.aM^{II}X'_{2}.bM^{III}X''_{3}:zA \qquad (I)$$

in which $M^{I}$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, , Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

In the formula (I), z is preferably a number satisfying the condition of $1 \times 10^{-4} \leq z \leq 0.1$; $M^{I}$ preferably comprises at least Cs; X preferably comprises at least Br; and A is preferably Eu or Bi, more preferably Eu.

The phosphor layer of the storage panel usable in the invention can be prepared according to a vapor-deposition process, which is one of the processes of gas phase-accumulation method. For example, in the vapor-deposition process, one or more evaporation sources comprising a stimulable phosphor or materials thereof are used to form a film of phosphor deposited by single vapor deposition or by multi-vapor deposition (co-deposition), respectively. The single or plural evaporation sources are heated to vaporize by means of a resistance heater or an electron beam, so that the vapor is deposited and accumulated on a substrate. During the vaporization and deposition, a medium vacuum of 0.1 to 10 Pa or a high vacuum of $1 \times 10_{-5}$ to $1 \times 10^{-2}$ Pa is kept. In the vapor-deposition procedure, the substrate may be heated or cooled. The temperature of the substrate is generally in the range of 20 to 350° C., preferably 100 to 300° C. The deposition rate, which means how fast the phosphor is deposited and accumulated on the substrate, is generally in the range of 0.1 to 1,000 μm/minute, preferably in the range of 1 to 100 μm/minute. The procedure may be repeated twice or more to form two or more phosphor films. After the deposition procedure is completed, the deposited layer can be subjected to heating treatment (annealing treatment). The thus-produced phosphor layer consists of phosphor in the form of columnar crystals grown almost in the thickness direction.

Thus produced phosphor layer consists of only the energy-storing phosphor without binder, and there are gap among the columnar crystals of the phosphor. The thickness of the phosphor layer depends on, for example, aimed characteristics of the panel, conditions and process of the deposition, but is normally in the range of 50 μm to 1 mm, preferably in the range of 200 to 700 μm.

The radiation image storage panel used in the invention basically comprises a support (substrate) and a thereon-provided phosphor layer formed by a gas-accumulation method. On the phosphor layer, a protective layer is preferably provided to keep the phosphor layer from chemical deterioration or physical shock. Further, the storage panel may comprise various other auxiliary layers such as a light-reflecting layer, and may be in known various structures such as a sealed structure to protect the phosphor layer from moisture-caused damages.

In the following description, a radiation image information-reading process adopting the method of the invention is explained, by way of example, in the case where the radiation source is an X-ray source.

Figure 4:
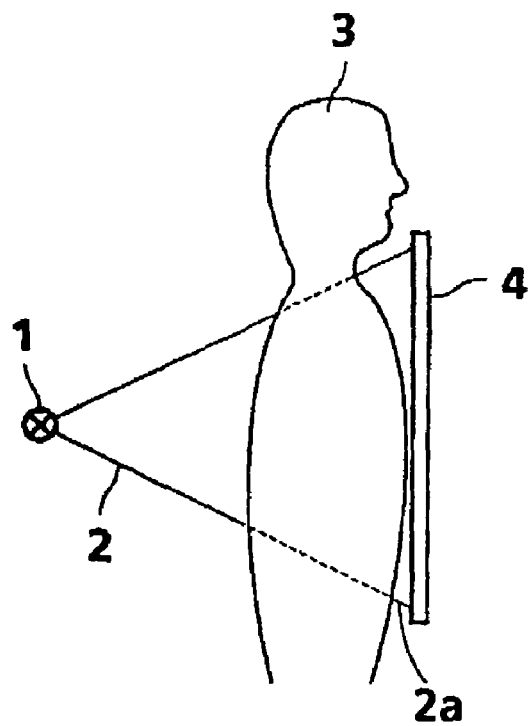
FIG. 4 is a sectional view schematically illustrating the chest X-ray radiography.

FIG. 4 is a sectional view schematically illustrating an example of X-ray image information recording. In FIG. 4, an X-ray generator 1 gives off X-rays 2. The X-rays 2 then pass through an object 3, to obtain information on spatial energy distribution of the object 3. The rays 2a having the information is received by a radiation image storage panel 4. Energy of the rays 2a is partly absorbed in a phosphor layer of the storage panel 4, so that the information on spatial energy distribution (X-ray image information) is recorded as a latent image. In some cases, the object 3 scatters or diffracts the X-rays 2.

The radiation image information-reading process is, for example, performed in a reading apparatus illustrated in FIG. 5. The apparatus shown in FIG. 5 comprises a reading unit 10, an image-processing device 20, an erasing unit 30 and an input-terminal 40.

First, the storage panel 4 in which the X-ray image information is recorded is placed in the reading unit 10, where the information is read out. The storage panel 4 is then transferred by a conveyer belt 50 in the direction indicated by the arrow Y. The speed of transferring the panel 4 is identical with the moving speed of the conveyer belt 50, which is input into the image-processing device 20. At the same time, stimulating rays L emitted from a laser source 11 are linearly focused onto the panel 4 through a cylindrical lens 12 placed on the optical path, so that the focused rays may be lined perpendicularly to the direction indicated by the arrow Y. The linearly focused stimulating rays L are thus applied to the panel 4, and thereby a stimulated emission M is given off from the applied area and from the neighbor thereof. The emission M has an intensity according to the stored X-ray image information. The stimulated emission M is led through a stimulating ray-cut filter 14, to remove the stimulating ray contaminating the emission M, and then passes through a SELFOC lens array 13, to be focused on light-receiving faces of photoelectric converting elements 16 constituting a line sensor 15.

The line sensor 15 comprises many (e.g., 1,000 or more of) photoelectric converting elements 16 arranged linearly and perpendicularly to the transferring direction indicated by the arrow Y. Examples of the photoelectric converting element 16 include an amorphous silicon sensor, a CCD sensor, a CCD with back illuminator and a MOS image sensor. Each photoelectric converting element one-to-one corresponds to each pixel.

The stimulated emission M received by each converting element 16 is photoelectrically converted into signals Q, which are then output into the image-processing device 20. In the image-processing device 20, the signals Q are processed on the basis of the moving speed of the conveyer belt 50 to obtain image data according to the position of the panel 4. The thus-obtained image data are output on an image-displaying device (not shown).

After the X-ray image information is thus read out, the storage panel 4 is transferred to the erasing unit 30 by the conveyer belt 50 in the direction indicated by the arrow Y. In the erasing unit 30, the X-ray energy remaining in the panel is erased. Prior to the reading and erasing procedures, the mass values of the X-ray generator 1 and the distance between the panel 4 and the generator 1 in recording the X-ray image information (FIG. 4) are beforehand input from the input-terminal (IT) 40. In the erase-controlling device 31 of the erasing unit 30, the exposure of X-rays is calculated in the manner illustrated above (FIG. 3) on the basis of the data input from the IT 40. According to the thus-calculated exposure and the beforehand-installed erasing table (or graded levels simplified from the erasing table), the amount of erasing light is determined. The erase-controlling device 31 sends control signals to the belt-driving controller 51, to adjust the speed of the conveyer belt 50 so that the panel 4 is irradiated with erasing light P in the determined amount. While the storage panel 4 is transferred by the belt 50 at the adjusted speed, the whole surface of the panel 4 is irradiated with the erasing light P emitted from the erasing light source placed above the belt 50. In this way, the necessary and sufficient amount of erasing light is applied to the storage panel 4.

Examples of the erasing light source include a sodium lamp, a fluorescent lamp, an infrared lamp and a cold cathode tube. For efficiently exhausting the radiation energy remaining in the panel, the panel 4 is preferably exposed to the easing light through a cut filter (not shown). For example, the panel is first exposed to the erasing light through a UV-cut filter, and then exposed to the light through a yellow acrylic filter (two-step erasing). Thus, the radiation energy remaining in the panel 4 is fully released as stimulated emission, and thereby the storage panel 4 is renewed for the use in the next recording and reproducing procedure.

The radiation image-reading apparatus used in the invention is not restricted to the embodiment shown in FIG. 5. For example, the amount of the erasing light can be controlled by adjusting the moving speed of the erasing light source. Further, each part of the apparatus (such as the light source, the light-collecting optical system between the light source and the storage panel, the optical system between the storage panel and the line sensor, and the line sensor) can have various known constitution.

In the above embodiment, the image information is read out by means of a combination of the line light source and the line sensor. However, a combination of a point light source (such as a laser) and a photo-multiplier tube can be used. Further, a two-dimensional stimulating means and a two-dimensional solid-state imaging device can be used in combination. The radiation image-reading apparatus may comprise an imaging means, by which image signals output from the image-processing device are subjected to various signal-treatments. The apparatus can be also equipped with an image-displaying means, by which a visible image based on the image signals is displayed on a CRT or a dry film.

In the above embodiment, the reading apparatus is equipped with the erasing unit. However, the erasing unit (erasing apparatus) can be separated from the reading apparatus. Further, the reading apparatus may be combined with a radiation image-recording apparatus to constitute a radiation image recording and reproducing apparatus (of built-in type).

EXAMPLE 1

(1) Production of Radiation Image Storage Panel

As the evaporation sources, powdery cesium bromide (CsBr, purity: 4N or more) and powdery europium bromide ($EuBr_2$, purity: 3N or more) were prepared. Each evaporation source was analyzed according to ICP-MS method (Inductively Coupled Plasma Mass Spectrometry), to find impurities. As a result, the CsBr powder was found to contain each of the alkali metals (Li, Ma, K, Rb) other than Cs in an amount of 10 ppm or less and other elements such as alkaline earth metals (Mg, Ca, Sr, Ba) in amounts of 2 ppm or less. The $EuBr_2$ was also found to contain each of the rare earth elements other than Eu in an amount of 20 ppm or less and other elements in amounts of 10 ppm or less. These evaporation sources are very hygroscopic, and hence were stored in a desiccator keeping a dry condition whose dew point was $-20°$ C. or below. Immediately before used, they were taken out of the desiccator.

Independently, an aluminum substrate as a support (thickness: 1 mm, size: 20 cm×20 cm) was mounted to a substrate holder in an evaporation-deposition apparatus. The above CsBr and $EuBr_2$ evaporation sources were individually placed in crucibles equipped with resistance heaters, respectively. The apparatus was then evacuated to make the inner pressure $1\times10^{-3}$ Pa by means a combination of a rotary pump, a mechanical booster and a diffusion pump, and successively Ar gas was introduced to set the inner pressure (Ar gas pressure) at 0.5 Pa. In the thus-prepared atmosphere, Ar plasma was generated by means of a plasma-generator (ion gun) to wash the surface of the substrate. After that, the apparatus was again evacuated to make the inner pressure $1\times10^{-3}$ Pa, and successively Ar gas was introduced again to set the inner pressure (Ar gas pressure) at 1 Pa. In order to form a deposited film of even thickness, the substrate was repeatedly moved linearly forward and backward. Each evaporation source was heated and melted by means of the resistance heater, so that CsBr:Eu stimulable phosphor was deposited and accumulated on the substrate at a rate of 6 μm/minute. During the deposition, the electric currents supplied to the heaters were controlled so that the molar ratio of Eu/Cs in the stimulable phosphor might be $1.21\times10^{-3}$. After the evaporation-deposition was complete, the inner pressure was returned to atmospheric pressure and then the substrate was taken out of the apparatus. On the substrate, a phosphor layer (thickness: 700 μm, area: 20 cm×20 cm) was formed. The formed phosphor layer consisted of the phosphor in the form of columnar crystals grown almost perpendicularly and aligned densely.

Thus, a radiation image storage panel comprising a support and a phosphor layer was produced according to the co-deposition process.

(2) Measurement of Erasing Value and Preparation of Erasing Table

The produced storage panel was exposed to X-rays emitted from an X-ray generator under the following irradiation conditions.

| Mass values: | tube voltage: | 80 kVp, |
|---|---|---|
| | tube current: | 200 mA, |
| | irradiation time: | 50 ms, |

Distance between the storage panel and tube: 180 cm.

The exposure was measured by means of a dosimeter placed beside the storage panel, and was found to be 20 mR. After exposed to the X-rays, the storage panel was irradiated with a stimulating light of a semi-conductor laser beam of 660 nm. The stimulated emission given off from the storage panel was detected by means of a point scanner (photo-multiplier tube) to measure the stimulated emission intensity A. The panel was then again exposed to X-rays under the following irradiation conditions.

| Mass values: | tube voltage: | 80 kVp, |
|---|---|---|
| | tube current: | 250 mA, |
| | irradiation time: | 2 s, |

Distance between the storage panel and tube: 180 cm.

The exposure was measured by means of the dosimeter placed beside the storage panel, and was found to be 1 R. Subsequently, the storage panel was subjected to two-step erasing, in which the erasing light was applied first through a UV-cut filter (N-169, Nitto Plastics Industries, Ltd.) and second through a yellow acrylic filter (N-039, Nitto Plastics Industries, Ltd., ratio of surface area between the former and latter filters: 3:2) onto the whole surface of the phosphor layer. The amount of the erasing light was 300,000 lux·s. After the erasing step was complete, the phosphor layer was exposed to the laser beam in the same manner as described above. The stimulated emission given off from the phosphor layer was detected with the point scanner to measure the stimulated emission intensity B. From the obtained intensity values A and B and the X-ray exposures, the erasing value of $(B/\{A\times(1000/20)\})$ defined hereinbefore was calculated. Further, the amount of erasing light was changed into 10,000 lux·s, 30,000 lux·s and 100,000 lux·s, and then the same procedures were repeated to obtain each erasing value shown in FIG. 1.

FIG. 1 is a graph showing a relationship between the erasing value and the amount of the erasing light (that is, erasing property).

The amount of erasing light necessary for erasing enough the radiation energy stored in a radiation image storage panel having been exposed to X-rays of 0.012 mR (namely, for erasing the radiation energy so that the panel can be practically used without troubles in the next recording and reproducing procedure) was estimated from FIG. 1 according to the exposure of X-rays. For example, if the exposure is 50 mR, the required erasing value is $0.012/50=2.4\times10^{-4}$. The graph shown in FIG. 1 indicates that the erasing value of $2.4\times10^{-4}$ corresponds to the erasing light amount of approx. 25,000 lux·s.

FIG. 2 shows thus obtained relationship between the exposure of X-rays (mR) and the required amount of the erasing light (namely, erasing table). The line indicated by ■-■ in FIG. 2 is an erasing table of the above storage panel. The other erasing table indicated by ♦-♦ in FIG. 2 was obtained in the case where a radiation image storage panel comprising a conventional phosphor layer formed by a coating process was examined.

(3) Procedures for Controlling the Amount of Erasing Light and Radiation Image Information-Reading Process The erasing table shown in FIG. 2 was simplified into the following three levels, which were beforehand installed in the erase-controlling device 31 of the radiation image-reading apparatus shown in FIG. 5.

When the exposure R is less than 50 mR (namely, in the range of R<50 mR), the amount of erasing light is 50,000 lux·s.

When the exposure R is in the range of 50 mR≦R<500 mR, the amount of erasing light is 150,000 lux·s.

When the exposure R is 500 mR or more (namely, in the range of 500 mR≦R), the amount of erasing light is 300,000 lux·s.

Independently, a radiation image storage panel was exposed to radiation having been emitted from an X-ray generator and having passed through an object, so that radiation image information of the object was recorded in the panel. The mass values of the X-ray generator and the distance between the panel and the generator were then input from the input-terminal 40. After the information recorded in the panel was read out, the panel was irradiated with erasing light in the amount determined on the basis of the input date and the beforehand installed levels. In this way, it was confirmed that the radiation energy remaining in the panel having been exposed to X-rays in various exposures was sufficiently erased.

What is claimed is:

1. A radiation image recording and reproducing method comprising the steps of applying a radiation onto a radiation image storage panel through an object, whereby recording a radiation image of the object in the storage panel; sequentially scanning the storage panel with a stimulating light to emit a stimulated light from the storage panel and photoelectrically detecting the emitted light to obtain electric signals of the radiation image; reproducing the radiation image from the electric signals; and erasing radiation energy remaining in the radiation panel, in which the radiation image storage panel has an energy-storing phosphor layer comprising a phosphor in the form of columnar crystals and the step of erasing radiation energy is performed using an erasing light in an amount determined from an amount of the radiation having been applied to the storage panel using an erasing table in which a predetermined relationship between an amount of the radiation applied to the storage panel and an amount of the erasing light is described, in which the relationship is described in such manner that the amount of the erasing light is described in the form of a predetermined value for the radiation energy applied to the storage panel in a predetermined range.

2. The radiation image recording and reproducing method of claim 1, in which the predetermined value of the amount of the erasing light is 400,000 lux·s for the radiation energy applied to the storage panel in the range of not larger than 2R but not less than 500 mR.

3. The radiation image recording and reproducing method of claim 1, in which the predetermined value of the amount of the erasing light is 200,000 lux·s for the radiation energy applied to the storage panel in the range of less than 500 mR but not less than 50 mR.

4. The radiation image recording and reproducing method of claim 1, in which the predetermined value of the amount of the erasing light is 100,000 lux·s for the radiation energy applied to the storage panel in the range of less than 50 mR.

* * * * *